US011503195B2

(12) United States Patent
Greene

(10) Patent No.: US 11,503,195 B2
(45) Date of Patent: Nov. 15, 2022

(54) METHOD AND APPARATUS FOR IMAGING CIRCADIOMETER

(71) Applicant: Westboro Photonics Inc., Ottawa (CA)

(72) Inventor: Chad Greene, Ottawa (CA)

(*) Notice: Subject to any disclaimer, the term of this patent is extended or adjusted under 35 U.S.C. 154(b) by 93 days.

(21) Appl. No.: 16/802,394

(22) Filed: Feb. 26, 2020

(65) Prior Publication Data
US 2020/0275005 A1    Aug. 27, 2020

Related U.S. Application Data

(60) Provisional application No. 62/810,540, filed on Feb. 26, 2019.

(51) Int. Cl.
| H04N 5/225 | (2006.01) |
| G02B 5/20 | (2006.01) |
| H04N 5/235 | (2006.01) |
| G01J 1/44 | (2006.01) |
| G06T 7/557 | (2017.01) |
| G02B 26/00 | (2006.01) |
| H05B 47/16 | (2020.01) |
| G01N 21/64 | (2006.01) |
| H04N 9/04 | (2006.01) |
| G01J 1/04 | (2006.01) |

(52) U.S. Cl.
CPC ............ *H04N 5/22541* (2018.08); *G01J 1/44* (2013.01); *G01N 21/6447* (2013.01); *G02B 5/201* (2013.01); *G02B 5/205* (2013.01); *G02B 26/008* (2013.01); *G06T 7/557* (2017.01); *H04N 5/2258* (2013.01); *H04N 5/2353* (2013.01); *H04N 5/2357* (2013.01); *H04N 9/04521* (2018.08); *H05B 47/16* (2020.01); *G01J 1/0492* (2013.01); *G01J 2001/448* (2013.01); *G06T 2200/21* (2013.01); *G06T 2207/10028* (2013.01); *G06T 2207/10052* (2013.01)

(58) Field of Classification Search
CPC ............ H04N 5/22541; H04N 5/2353; H04N 5/2357; H04N 9/04521; H04N 5/23238; H04N 5/247; G01J 1/44; G01J 1/0492; G01J 2001/44; G01J 2003/1217; G01J 3/0213; G01J 3/0235; G01J 3/2803; G01J 3/32; G01J 3/465; G01N 21/6447; G02B 5/201; G02B 5/205; G02B 26/008; G06T 7/557; G06T 2200/21; G06T 2207/10028; G06T 2207/10052; H05B 47/16
USPC ....................................................... 382/206
See application file for complete search history.

(56) References Cited

U.S. PATENT DOCUMENTS

| 5,900,942 | A | † | 5/1999 | Spiering | |
| 2009/0153797 | A1 | * | 6/2009 | Allon | A61B 3/12 362/11 |
| 2011/0181757 | A1 | † | 7/2011 | Fish | |

(Continued)

OTHER PUBLICATIONS

Lucas, R.J., et al. (2014), Measuring and using light in the melanopsin age. (Year: 2014).*

(Continued)

*Primary Examiner* — Lin Ye
*Assistant Examiner* — Chan T Nguyen

(57) ABSTRACT

A system and method for an imaging circadiometer that measures the spatial distribution of eye-mediated, non-image-forming optical radiation within the visible spectrum.

7 Claims, 16 Drawing Sheets

(56) References Cited

U.S. PATENT DOCUMENTS

2012/0300294 A1* 11/2012 Jess .................... G02B 21/06
                                                                                 359/885
2019/0069777 A1* 3/2019 Krall .................... A61B 3/14

OTHER PUBLICATIONS

Viénot et al., "Colorimetry and Physiology—The LMS Specification". In *Digital Color* (pp. 1-28). John Wiley & Sons, Inc. https://doi.org/10.1002/9781118562680.ch1 (2013).

Kaiser, P. K., "Photopic and Mesopic Photometry, Yesterday, Today and Tomorrow" in.*Golden Jubilee of Colour in the CIE 1931-1981*, pp. 28-52 (1981).

Bieske et al., "Definition and Measurement of Circadian Radiometric Quantities". Light and Engineering vol. 14 No. 1, p. 13-16,(2006).

Kosztyan et al., "Matrix-based color measurement corrections of tristimulus colorimeters," Applied Optics, vol. 49, No. 12, pp. 2288-2301, https://doi.org/10.1364/AO.49.002288 (2010).

Deutsches Museum. "MKF-6M Remote Sensing Camera". https://web.archive.org/web/20160622143929/http://www.deutsches-museum.de/en/collections/transport/astronautics/space-cameras/camera-mkf-6m (Snapshot of Jun. 22, 2016).

Drew, M. S., and G. D. Finlayson. 2000. "Spectral Sharpening with Positivity," J. Optical Society of America A 17(8):1361-1370.

Glickman, G., et al. 2003. "Inferior Retinal Light Exposure is More Effective than Superior Retinal Exposure in Suppressing Melatonin in Humans," Journal of Biological Rhythms 18(1):71-79.

Buhr, Ethan D., et al. 2015. "Neuriopsin (OPN5)-mediated Photoentrainment of Local Circadian Oscillators in Mammalian retina and Cornea", PNAS, Oct. 20, 2015, pp. 13093-13098, vol. 112, No. 42.

Lucas, Robert J., et al. 2013. "Irradiance Toolbox User Guide", Oxford, Oct. 2013, pp. 1-19.

Figueiro, M. G., and M. S. Rea. 2010. "The Effects of Red and Blue Lights on Circadian Variations in Cortisol, Alpha Amylase, and Melatonin," International Journal of Endocrinology col. 2010, Article ID 829351.

Kojima, D., et al. 2011. "UV-Sensitive Photoreceptor Protein OPN5 in Humans and Mice," Public Library of Science (PloS) One. 6(10): e26388.

CIE S 026/E:2018, "CIE System for Metrology of Optical Radiation for ipRGC-Influenced Responses to Light."

Lucas, R. J., et al. 2013. "Measuring and Using Light in the Melanopsin Age," Trends in Neuroscience 37(1):1-9.

Osterberg, G. 1935. "Topography of the Layer of Rods and Cones in the Human Retina," Acta Opthalmologica (Suppl.) 6:1-103.

Rüger, M., et al. 2005. "Nasal versus Temporal Illumination of the Human Retina: Effects on Core Body Temperature, Melatonin, and Circadian Phase," Journal of Biological Rhythms 20(1):60-70.

Valiente-Soriano, F. J., et al. 2014. "Distribution of Melanopsin Positive Neurons in Pigmented and Albino Mice: Evidence for Melanopsin Interneurons in the Mouse Retina," Frontiers in Neuroanatomy 8, Article 131.

CIE 1995. Discomfort Glare in Interior Lighting. CIE 117-1995.

Levin, R. E. 1975. "Position Index in VCP Calculations," J. illuminating Engineering Society 4(2):99-105.

Jenkins et al., "Digital imaging colorimeter for fast measurement of chromaticity coordinate and luminance uniformity of displays." Proceedings of SPIE 4295.1, pp. 176-187 (2001).

CIE S 026/E:2018. (2018). CIE System for Metrology of Optical Radiation for IPRGC-Influenced Responses to Light. https://doi.org/10.25039/S026.2018 (2018).

Gall et al., "Definition and Measurement of Circadian Radiometric. Light and Health—Non-Visual Effects" Proceedings of the CIE Symposium '04, pp. 129-132 (Oct. 2004).

Bieske et al., "Space Resolved Measurements of Circadian Radiation Quantities in the Work Place." Light & Engineering (Svetotechnika), vol. 14, No. 2, pp. 41-46 (2006).

Krueger et al. Applications of Image Resolved Light and Colour Measurement Zeitschrift. Light & Engineering (Svetotechnika), vol. 13, No. 5, pp. 57-63 (2005).

Lucas et al., "Measuring and using light in the melanopsin age. Trends in Neurosciences," vol. 37 No. 1, pp. 1-9 (2014). https://doi.org/10.1016/j.tins.2013.10.004.

Price, et al. CIE TN 003:2015. Report on the First International Workshop on Circadian and Neurophysiological Photometry, 2013—CIE Technical Report, pp. 1-40 (2015).

Knoop, et al. Characterisation of Daylight's Spatial and Spectral Distribution to Assess Its Impact on Human Beings, In CIE (Ed.), CIE 2017 Midterm Meetings and Conference on Smarter Lighting for Better Life At: Jeju Island, Korea, pp. 1-10, CIE. https://doi.org/10.25039/x044.2017 (2017).

Broszio et al., "Nicht-visuelle Beleuchtung: Reichen integrale Messgrößen aus?" Lux Junior, 9, pp. 1-9 (2017).

Broszio et al., "Nicht-visuelle Beleuchtung: Reichen integrale Messgrößen aus?" Lux Junior, 9, pp. 1-9 (2017). (partial translation).

Vienot.†
Kosztyan.†
Deutsches Museum, MKF 6M Remote Sensing Camera.†
Kaiser.†
Bieske.†
Jenkins.†
Gall.†
Krueger.†
Price.†
Broszio.†
Knoop.†
Lucas.†
CIE System for Metrology of Optical Radiation.†

\* cited by examiner
† cited by third party

METHOD AND APPARATUS FOR IMAGING CIRCADIOMETER

TECHNICAL FIELD

The subject matter of the present invention relates to digital imaging. In particular, it relates to a system and method for measuring the spatial distribution of eye-mediated, non-image-forming optical radiation within the visible spectrum.

BACKGROUND

There are a variety of photoreceptors in the retina of the human eye, including cones, rods, and intrinsically photosensitive retinal ganglion cells (ipRGCs). The cones provide color vision, the rods provide monochromatic vision under low light levels, and the ipRGCs serve as a zeitgeber ("time-giver") to synchronize (or "entrain") the circadian rhythm of the human biological clock to the ambient light levels of the (natural) environment.

Historically the spectral responsivities of these photoreceptors were published in Kojima, D., et al. 2011. "UV-Sensitive Photoreceptor Protein OPN5 in Humans and Mice," Public Library of Science (PloS) ONE. 6(10): e26388. Their distributions (i.e. α-opic distributions) are identified as:

| Opsin | Spectral Response | Approximate Peak Sensitivity |
|---|---|---|
| OPN1SW ("blue opsin") | Cyanopic | 425 nm |
| OPN1MW ("green opsin") | Chloropic | 530 nm |
| OPN1LM ("red opsin") | Erythropic | 560 nm |
| Rh (rhodopsin) | Rhodopic | 495 nm |
| OPN4 (melanopsin) | Melanopic | 480 nm |
| OPN5 (neuropsin) | Neuropic | 380 nm | where the opsins are light-sensitive proteins within the photoreceptive cells. These distributions are spectral responsivity distributions of short-wavelength cones (S-cones), medium-wavelength cones (M-cones), long-wavelength cones (L-cones), rods, ipRGCs, and neuropsin.

In 2018 these spectral responsivities were updated and published by the Commission Internationale de l'Eclairage (International Lighting Commission) in CIE S 026/E:2018, "CIE System for Metrology of Optical Radiation for ipRGC-Influenced Responses to Light," wherein the cone and rod spectral responsivities referenced those in the existing publication CIE 15:2004, "Colorimetry," Third Edition. These updated distributions are identified as:

| Photoreceptor | Spectral Response | Peak Sensitivity |
|---|---|---|
| S-Cone | Cyanolabe | 450 nm |
| M-Cone | Chlorolabe | 542 nm |
| L-Cone | Erythrolabe | 570 nm |
| Rod | Rhodopsin | 510 nm |
| ipRGC | Melanopsin | 490 nm |

While the neuropic spectral response was not formally identified in CIE S 026/E:2018 as an opsin which is related to human ipRGC-influenced responses, it nevertheless remains a compelling part of the scientific investigation into human physiological and psychological responses to light.

Additionally, while no specific photoreceptors containing neuropsin have been identified in the human retina, it is known to be present in the human cornea, and it has been shown to be involved in the synchronization of circadian rhythms in mice and (presumably) humans.

It is also known that the synchronization of circadian rhythms in mammals involves input from not only ipRGCs, but cones and rods (e.g., Lucas, R. J., et al. 2013. "Measuring and Using Light in the Melanopsin Age," Trends in Neuroscience 37(1):1-9). Known response signaling pathways involving each of the opsins are shown by Lucas, which illustrates the interconnection of ipRGCs with rod and cone photoreceptors and the integration of their signals involved in circadian rhythm entrainment.

Finally, it is known that cones, rods, and ipRGCs are not evenly distributed across the human retina, as shown by Valiente-Soriano (from Valiente-Soriano, F. J., et al. 2014. "Distribution of Melanopsin Positive Neurons in Pigmented and Albino Mice: Evidence for Melanopsin Interneurons in the Mouse Retina," Frontiers in Neuroanatomy 8, Article 131) and Osterberg (from Osterberg, G. 1935. "Topography of the Layer of Rods and Cones in the Human Retina," Acta Opthalmologica (Suppl.) 6:1-103).

Valiente-Soriano illustrates the uneven spatial distribution of ipRGCs in pigmented mice retina. The four retinal quadrants are denoted by the letters S, N, I, T, and they are: supero-temporal (ST), supero-nasal (SN), infero-temporal (IT) and infero-nasal (IN). The number of ipRGCs represented is the number shown in the lower left of the illustration. The color scale goes from 0-3 (purple) to ≥28 (red) neighbors. The scale bar is 500 μm. Osterberg illustrates the angular distribution of the rods and cones within the human retina.

The cones responsible for color vision are mostly located within the center of the retina, with an angular extent in the field of view of approximately two degrees. Meanwhile, the rods, which are responsible for low light level vision, are almost entirely distributed in the retinal angular field of view regions not covered by the cones. In addition to these, there are at least five different types of ipRGCs (not all of which are involved in circadian rhythm entrainment), but their distribution is such that inferior retinal exposure (that is, light from above horizontal) is more effective in suppressing melatonin secretion in humans than superior retinal exposure (Glickman, G., et al. 2003. "Inferior Retinal Light Exposure is More Effective than Superior Retinal Exposure in Suppressing Melatonin in Humans," Journal of Biological Rhythms 18(1):71-79).

Similarly, temporal retinal exposure (that is, light from the left-hand side of the visual field for the right eye and vice versa for the left eye) is more effective than nasal retinal exposure (Rügger, M., et al. 2005. "Nasal versus Temporal Illumination of the Human Retina: Effects on Core Body Temperature, Melatonin, and Circadian Phase," Journal of Biological Rhythms 20(1):60-70). An example of this unequal spatial distribution of ipRGCs is presented by Valiente-Soriano.

Optical radiation incident upon the human retina is therefore sensed by rods, cones, ipRGCs, and possibly neuropsin as a means of acquiring information about the environment to aid in entraining the human biological clock to daily cycles of light and darkness. While the signals generated by the rod and ipRGC photoreceptors do not form perceived images, the uneven distribution of ipRGCs and cones results in the process being responsive to the average gaze direction of the observer and the spatial distribution of objects and their spectral radiance properties within the observer's field of view.

Research into the effects of optical radiation on the entrainment of circadian rhythms of the human body is ongoing.

SUMMARY OF INVENTION

It is evident from the above however that there is a need for a research instrument that can accurately measure the spatial distribution of objects and their spectral radiance properties within the observer's field of view. This instrument may be termed an imaging circadiometer as it includes as a minimum the ability to measure the five retinal irradiance quantities shown by CIE S 026/E:2018.

As these effects become better understood, it is likely that industry standards for architectural luminaires and display devices such as laptop computers and tablets will incorporate recommended limits of melanopic radiance (e.g., Lucas et al. 2013). There may also be a need for a (production) instrument that can similarly measure the spatio-spectral radiance distribution of display devices such as LCD screens.

Disclosed herein is an imaging circadiometer comprising an imaging optical system, an optional beam shaping or attenuation optic, a filter wheel, a two-dimensional photo-detector array, and a digital image processing unit.

Further disclosed herein is an imaging circadiometer comprising: one or more optical elements positioned in sequence on an optical axis to image an environment; a photodetector array on the optical axis; a filter wheel having multiple filters that are individually positionable on the optical axis, the filter wheel positioned between the one or more optical elements and the photodetector array; and a digital image processing unit electrically connected to the photodetector array.

DETAILED DESCRIPTION

Figure 1:
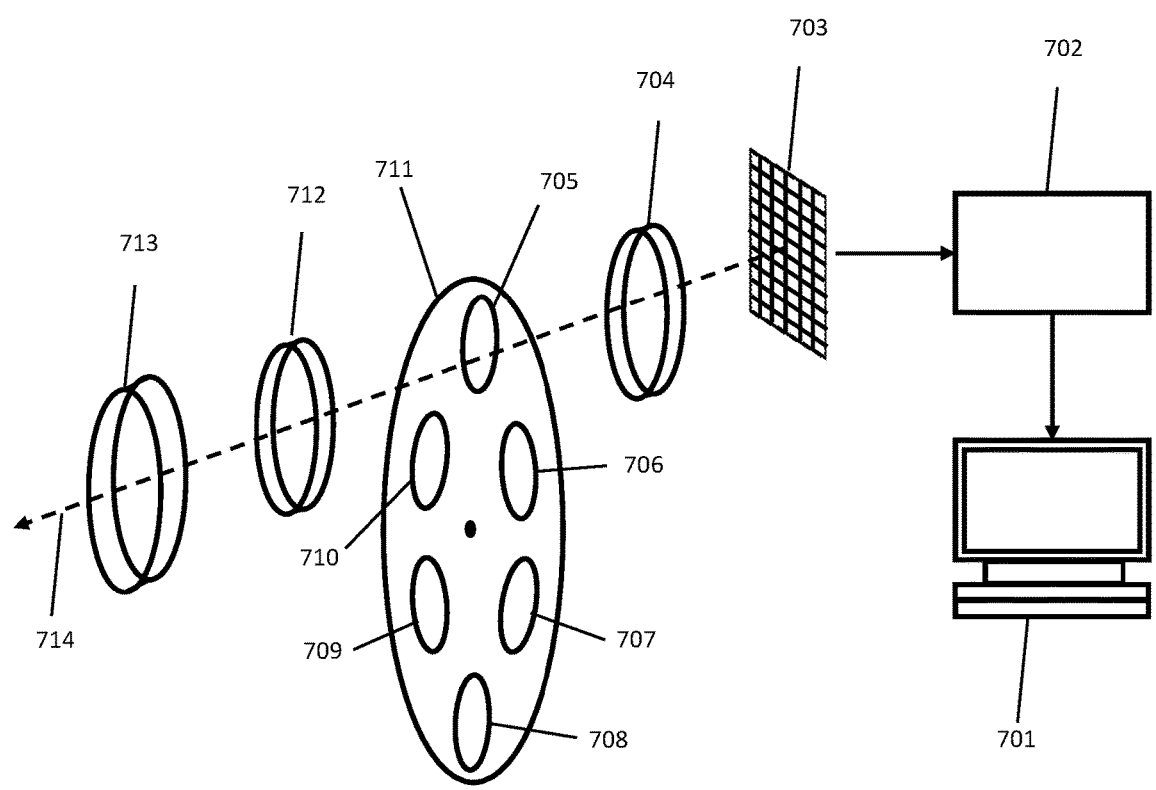
FIG. 1 illustrates one possible embodiment of an imaging circadiometer using a filter wheel and digital camera.

Referring to FIG. 1, the imaging circadiometer is comprised of an imaginary system optical axis 714 upon which are positioned in sequence one or more optical elements 713 to image the environment, an optional prefiltering optic 712 to perform beam apodization or shaping, steering or attenuation, a filter wheel 711 comprising filter 710 with a melanopic spectral transmittance, filter 709 with a rhodopic (also referred to as "scotopic") spectral transmittance, filter 708 with an erythropic spectral transmittance, filter 707 with a chloropic spectral transmittance, filter 706 with a cyanopic spectral transmittance, and optional filter 705 with a neuropic spectral transmittance, an optional postfiltering optic 704 to perform further beam apodization or shaping, steering or attenuation, and a two-dimensional photodetector array 703. The photodetector array is electrically connected to a digital image processing unit 702, which may further be connected to a general-purpose computer 701 to analyze, display and store circadiometer images. The filters are individually positionable on the optical axis, or situated on the filter wheel so that they can be individually positioned on the optical axis.

The optical elements 713 may include any combination of refractive lenses, reflective mirrors, and diffractive optical elements.

A particular function of prefiltering optic 712 or postfiltering optic 704 may be to represent the unequal spatial distribution of both cones and ipRGCs across the retina. The optics may include spatially-varying neutral density filters to model the spatially-varying responsivity. (This function may also be performed as a post-processing step during image analysis, but it would be limited by the image dynamic range. A spatially-varying neutral density filter would preserve the full dynamic range of the images.)

In addition to the spatial distribution of photoreceptors in the human retina, the observer's field of view is also dependent on their facial anthropometry. This issue has long been recognized in the calculation of visual glare by means of the Guth position metric (e.g., CIE 1995. Discomfort Glare in Interior Lighting. CIE 117-1995, and Levin, R. E. 1975. "Position Index in VCP Calculations," J. Illuminating Engineering Society 4(2):99-105). This reference illustrates the angular distribution of the rods and cones within the human retina, and the observer's sensitivity to visual glare is a function of both the vertical and horizontal angles from the gaze direction (where V/R and L/R are their respective tangents.)

An equivalent to the Guth position index for ipRGC spatial responsivity has yet to be formalized in the academic literature, but it certainly exists as shown by Glickman et al. 2003, Rügger et al. 2005, and others. An imaging circadiometer that measures the influence of optical radiation received by an observer for an unrestricted visual field would therefore require a fisheye lens to generate a hemispherical field of view, and a prefiltering or postfiltering optic to represent the position index spatial responsivity. (Alternatively, this function could be performed in software during image analysis.)

In one embodiment, prefiltering optic 712 or postfiltering optic 704 is comprised of spatially-varying neutral density filters that are specific to the spatial sensitivities of the short-wavelength, medium-wavelength and long-wavelength cones, rods, ipRGCs, and the observer's field of view for neuropsin.

Filter wheel filters 705 through 710 may include any combination of dyed glass or polymers, and thin-film interference filters or antireflection coatings deposited on a transparent substrate.

There is further evidence that different combinations of red and blue light may enhance or suppress the production of melatonin and other hormones that contribute to the entrainment of circadian rhythms in humans and other mammals (e.g., Figueiro, M. G., and M. S. Rea. 2010. "The Effects of Red and Blue Lights on Circadian Variations in Cortisol, Alpha Amylase, and Melatonin," International Journal of Endocrinology Col. 2010, Article ID 829351). As research into the effects of optical radiation on circadian rhythm entrainment and disruption proceeds, it may be necessary to account for them in the image generation and analysis of the circadiometer.

In the simplest scenario, the effects of colored light may be due to a linear combination of the signals from the long-, medium-, and short-wavelength cones, the rods, and the ipRGCs. If so, then the images recorded through each filter may be combined by means of a linear transform, similar to the "spectral sharpening" techniques used for optimizing the spectral responses of RGB color sensors in digital cameras (e.g., Drew, M. S., and G. D. Finlayson. 2000. "Spectral Sharpening with Positivity," J. Optical Society of America A 17(8):1361-1370). This could be accomplished in software during image analysis, although it would likely be necessary to take into account the history of previously recorded images in a sequence, as the response time of circadian entrainment and disruption to optical radiation exposure is measured in tens of minutes to hours.

In another scenario however, it is possible that the effects of colored light may be due to electrochemical interactions between the opsins in adjacent photoreceptors. If so, then the effect of colored light may involve changes in their spectral responsivity distributions, such that a linear combination of images recorded through filters 705 to 710 may not accurately represent the effects of the colored light.

In an embodiment then, the filter wheel includes filters whose spectral transmittance correctly accounts for any changes in the spectral responsivity distributions due to electrochemical interactions with colored light. Given that colored light appears to produce both enhancement and suppression of circadian-linked hormones, a linear combination of images may include images that are subtracted rather than added.

Figure 2:
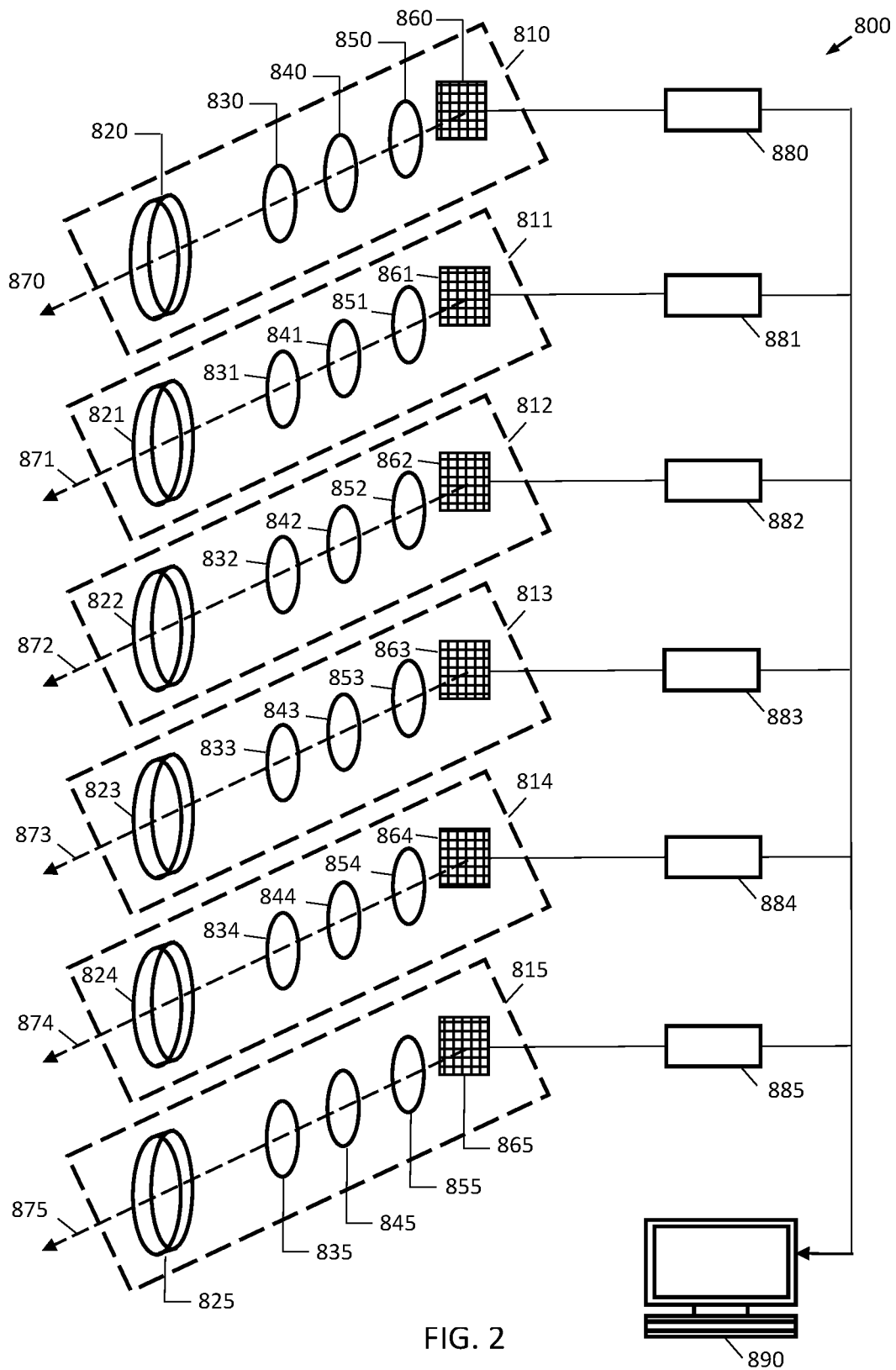
FIG. 2 illustrates another possible embodiment of an imaging circadiometer using a system of digital cameras and filters.

In an embodiment for use when measurement speed must be maximized, the filters 706 to 710 assembled within the filter wheel 711 in FIG. 1 are instead assembled into five imaging sub-systems 810 to 814 as illustrated by the imaging circadiometer 800 in FIG. 2. The imaging sub-systems consist of imaginary optical axes 870 to 874, upon which are positioned in sequence one or more optical elements 820 to 824 to image the environment, optional prefiltering optics 830 to 834 to perform beam apodization or shaping, steering or attenuation, optional postfiltering optics 850 to 854 to perform further beam apodization or shaping, steering or attenuation, and two-dimensional photodetector arrays 860 to 864. The photodetector arrays are electrically connected to digital image processing units 880 to 884, which may further be connected to a general-purpose computer 890 to analyze, display and store circadiometer images. Also within each imaging sub-system between the optional pre- (830 to 834) and postfiltering (850 to 854) optics, are one of the filters: 840 with a melanopic spectral transmittance, 841 with a rhodopic (also referred to as "scotopic") spectral transmittance, 842 with an erythropic spectral transmittance, 843 with a chloropic spectral transmittance, and 844 with a cyanopic spectral transmittance.

An optional sixth imaging sub-system 815 may be added to the embodiment illustrated in FIG. 2. This sixth imaging sub-system consists of an imaginary optical axis 875, upon which is positioned in sequence one or more optical elements 825 to image the environment, optional prefiltering optic 835 to perform beam apodization or shaping, steering or attenuation, optional postfiltering optic 855 to perform further beam apodization or shaping, steering or attenuation, and a two-dimensional photodetector array 865. The photodetector array is electrically connected to digital image processing unit 885, which may further be connected to a general-purpose computer 890 to analyze, display and store circadiometer images. Also within this imaging sub-system 815, between the prefiltering 835 and postfiltering 855 optics, is filter 845 with a neuropic spectral transmittance.

Figure 3:
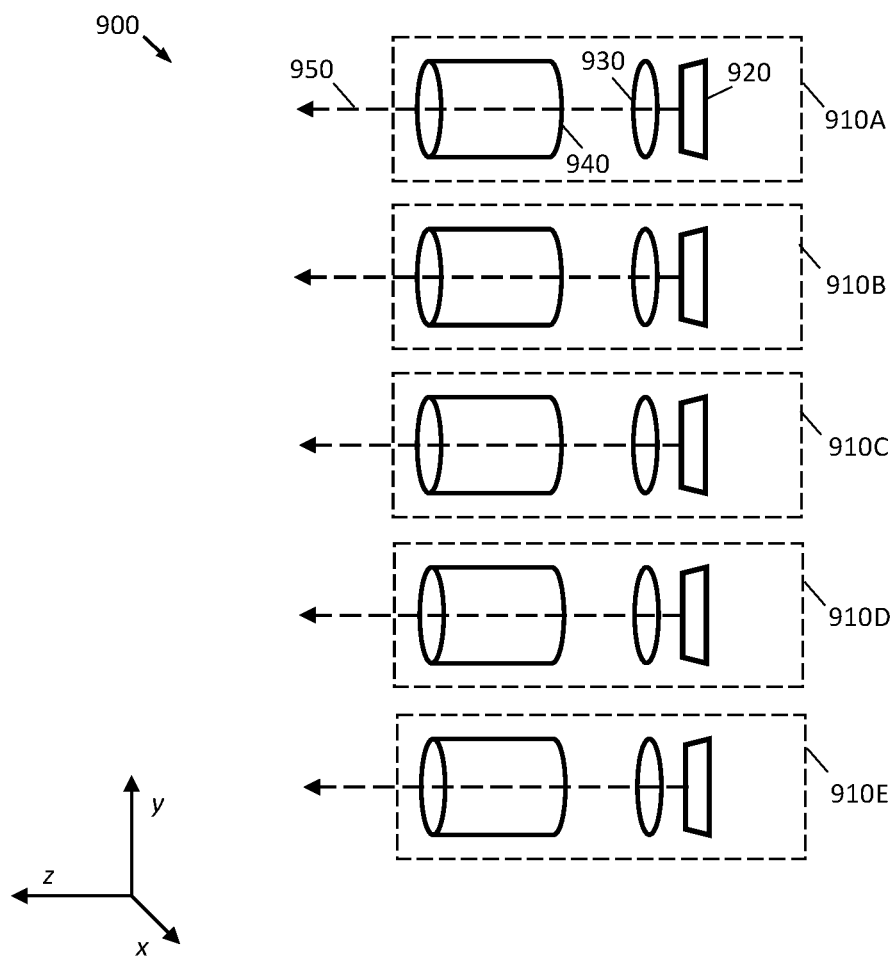
FIG. 3 is a schematic drawing of an embodiment of the invention wherein the imaging subsystems of an imaging circadiometer are aligned with their axes parallel to the z-axis.

In one embodiment of the invention shown in FIG. 3, an imaging circadiometer 900 includes a plurality of digital imaging subsystems 910A-E aligned on axes 950 that are parallel with each other. Each digital imaging subsystem 910A-E includes a digital imaging sensor 920, a fixed optical filter 930, and an imaging optics module 940 with optical axis 950. Sensors 920 and filters 930 are in planes parallel to the x-y plane, and the axes 950 of imaging optics modules 940 are aligned parallel to the z-axis.

Each digital imaging subsystem 910A-E has a different spectral responsivity distribution as determined by the combination of the spectral transmittance of the imaging optics module 940, the spectral transmittance distribution of the optical filter 930, and the spectral responsivity distribution of the imaging sensor 920.

The optical filter 930 may be an inorganic glass filter, an organic polymer filter, a thin film filter, a combination thereof, or any other transparent material with a desired spectral transmittance distribution.

The spectral transmittance distribution of the optical filter 930 may be fixed, or it may be electrically tunable The optical filter 930 may further incorporate a linear or circular polarizer.

In some embodiments, the imaging sensor 920 may be offset in the x-y plane with respect to the imaging optics axis 950.

The resolution, size, and type of imaging sensor 920 may be different for each imaging subsystem 910A-E. For instance, a sensor used to collect the melanopic radiance may have a lower resolution than one or some of the other sensors. Again, for instance, a sensor with a spectral range in the midinfrared may have a lower resolution than a sensor with a spectral range in the visible region of the spectrum. Similarly the optics module 940 may be different for each imaging subsystem 910A-E. Additionally, image sensor binning strategies may also result in different effective resolutions for each image sensor 920, and specific region sampling strategies may result in different effective sizes for each image sensor 920. For example a binning strategy may include binning 2×2, 3×3, 4×4 . . . n×n pixels, where every n×n pixels within an image are summed, or potentially averaged, thus creating a new image with a new resolution given by Equation 1.

$$\text{new resolution} = \text{original resolution}/(n \times n) \quad \text{(Eq. 1)}$$

Figure 4:
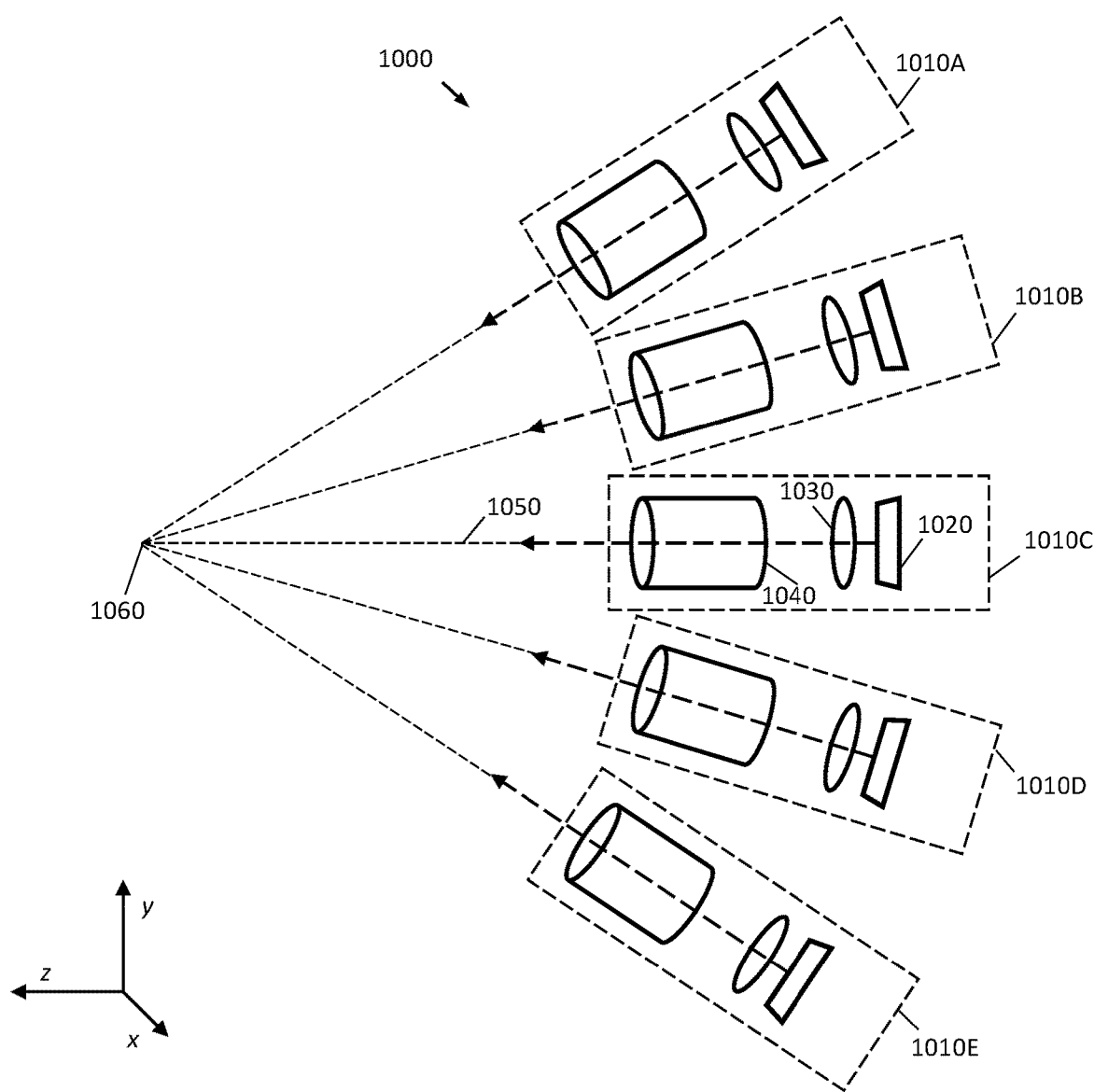
FIG. 4 is a schematic drawing of an embodiment of the invention wherein the optical axes of the imaging subsystems of an imaging circadiometer intersect at a common point on the z-axis.

In another embodiment shown in FIG. 4, the invention is an imaging circadiometer 1000 that is comprised of a plurality of digital imaging subsystems 1010A-E, wherein each digital imaging subsystem has a digital imaging sensor 1020, a fixed optical filter 1030, and imaging optics module 1040 with optical axis 1050. Axes 1050 of the imaging subsystems 1010A-E are aligned such that they intersect at a common point of focus 1060 on the z-axis.

Figure 5:
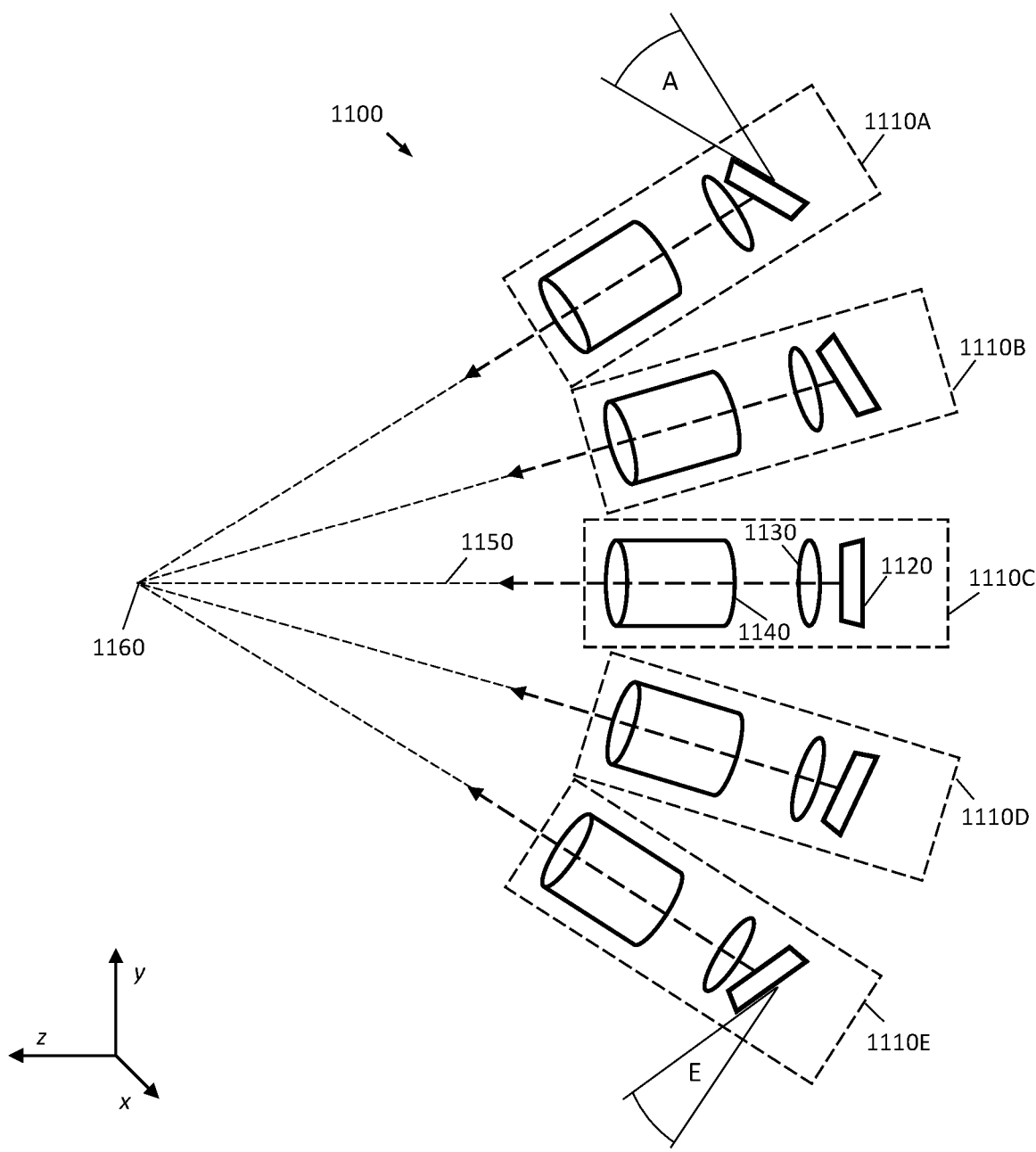
FIG. 5 is a schematic drawing of an embodiment of the invention wherein four of the imaging sensors of an imaging circadiometer are tilted with respect to the optical axis rather than perpendicular to the optical axis.

In another embodiment shown in FIG. 5, the invention is an imaging circadiometer 1100 that is comprised of a plurality of digital imaging subsystems 1110A-E, wherein each digital imaging subsystem has a digital imaging sensor 1120, a fixed optical filter 1130, and imaging optics module 1140 with optical axis 1150. Optical axes 1150 of the imaging subsystems 1110A-E are aligned such that they intersect at a common point 1160 on the z-axis. Critically, imaging sensors 1120A,B,D,E are tilted relative to the respective optical axis 1150 rather than perpendicular to it. Imaging sensor 1120A is tilted at an angle A to its corresponding optical axis 1150, whereas imaging sensor 1120E is tilted at an angle E to its corresponding optical axis. Imaging sensors 1120B,D are likewise similarly tilted with respect to their corresponding optical axes. Digital imaging subsystems 1110A,B,D,E are therefore optically equivalent to a photographic view camera with a tilted lens plane. Imaging sensor 1120 in digital imaging subsystem 1110C is perpendicular to its corresponding optical axis 1150, because it is parallel to the object plane when the corresponding digital imaging subsystem 1110C is aligned with its optical axis perpendicular to the object plane. As will be familiar to those skilled in the art, tilting the lens plane with respect to the sensor plane results in the object plane being similarly tilted in accordance with the Scheimpflug condition. This can be accomplished by tiling the lenses, tilting the sensors, or tilting the lenses and the sensors relative to the object plane as required.

Figure 6:
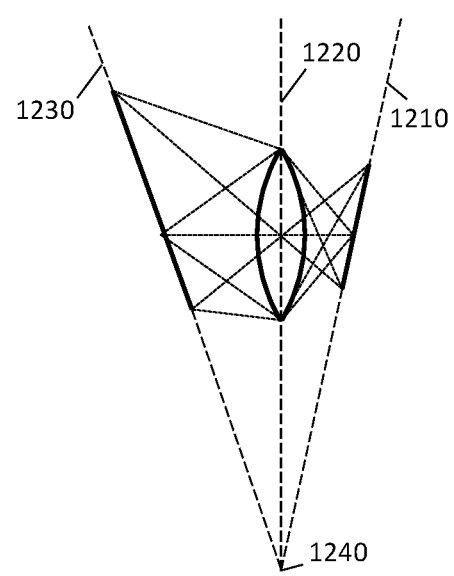
FIG. 6 illustrates the geometry of the Scheimpflug condition.

As shown in FIG. 6, the Scheimpflug condition is satisfied when the sensor plane 1210, the lens plane 1220 and the object plane 1230 intersect along a common axis 1240. When this condition is satisfied, all points on the object plane 1230 are in optimal focus on the sensor plane 1210. This confers an advantage on the previous embodiment in that the object plane 1230 can be the same for each imaging subsystem 1110A-E, thereby avoiding potential depth-of-field problems with high-resolution digital imaging sensors 1120 under low-light level conditions.

Figure 7:
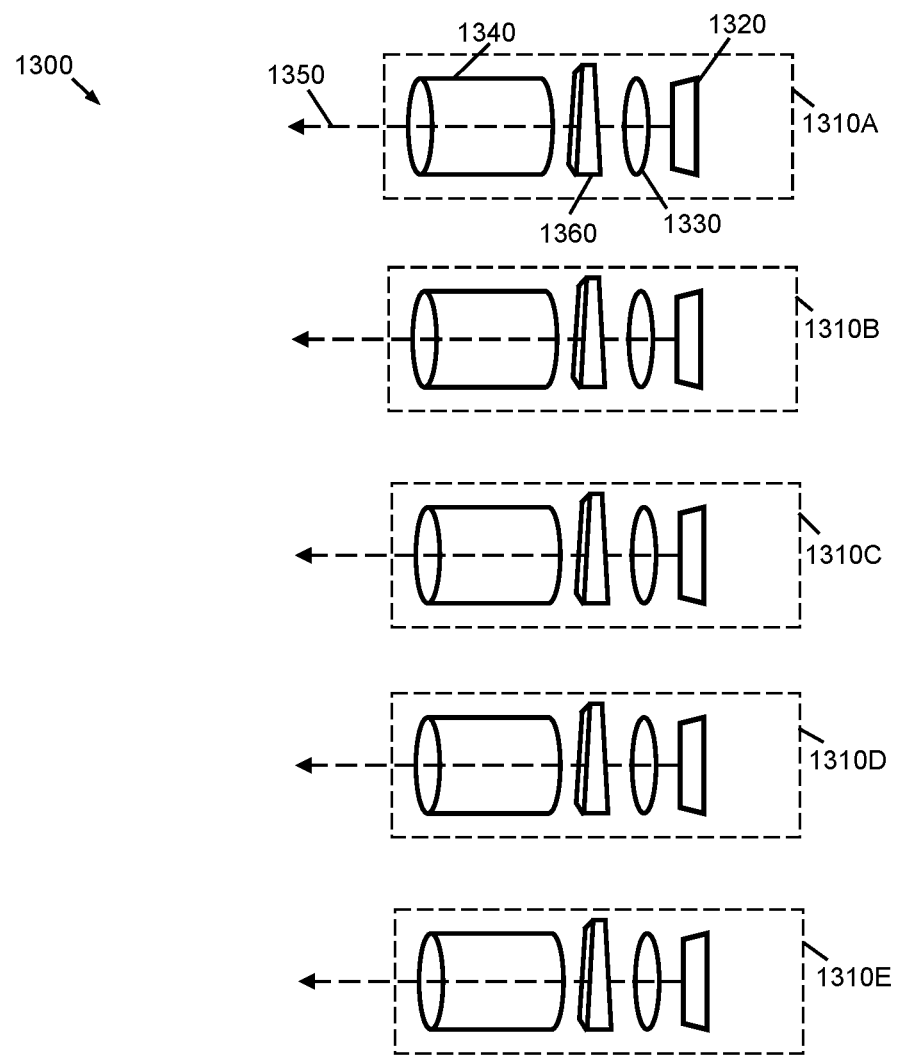
FIG. 7 is a schematic drawing of an embodiment of the invention wherein the imaging subsystems of an imaging circadiometer are aligned with their axes parallel to the z-axis and provided with corrector plates.

In another embodiment shown in FIG. 7, the invention is an imaging circadiometer 1300 that is comprised of a plurality of digital imaging subsystems 1310A-E, wherein each subsystem has a digital imaging sensor 1320, a fixed optical filter 1330, and imaging optics module 1340 with optical axis 1350. Sensors 1320 and filters 1330 are in planes parallel to the x-y plane, and the imaging optics modules 1340 are aligned with their axes 1350 parallel to the z-axis. Interposed between the imaging optics module 1340 and fixed optical filter 1330 is an optically transparent corrector plate 1360. Alternatively the corrector plate 1360 could instead be interposed between each sensor 1320 and filter 1330. The corrector plates are similar, and are arranged similarly in each digital imaging subsystem 1310 so that a similar correction is applied to the image in each digital imaging subsystem. This is so that the imaging circadiometer 1300 can focus on an object in a plane that is not perpendicular to the optical axes 1350.

Figure 8:
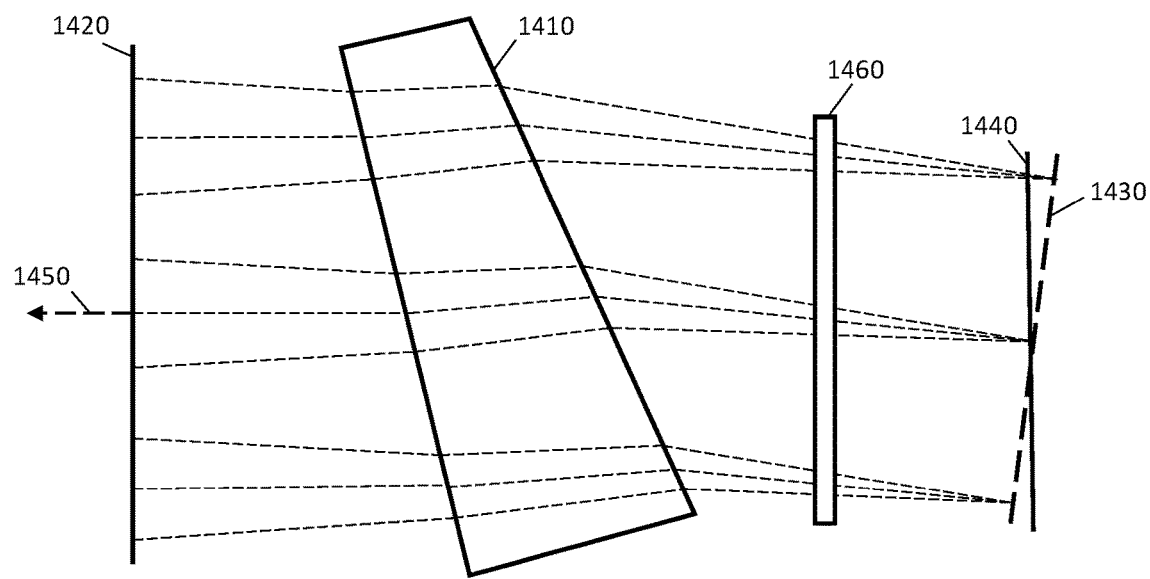
FIG. 8 illustrates an optical corrector plate that satisfies the Scheimpflug condition.

As shown in FIG. 8, optical corrector plate 1410 is comprised of a transparent material that forms a prism, in which the prism is referred to as a "Scheimpflug normalizer". The transparent material is preferably a low-dispersion glass with a high refractive index. Refraction of incident light from the imaging optics module 1420 results in the image plane 1430 being tilted, even though the optical axis 1450 is perpendicular to the sensor plane 1440. An object that is suitably tilted relative to the sensor plane 1440 forms an image that is in the sensor plane, because of the deviation in the light path introduced by the corrector plate 1410.

Optical corrector plate 1410 may be separate from optical filter 1460, or it may be combined into a combination filter and corrector plate. Depending on the dispersion characteristics of the transparent material, it may be necessary to limit the spectral bandwidth of the optical filter to avoid spectral smearing of the image on the sensor plane.

Figure 9:
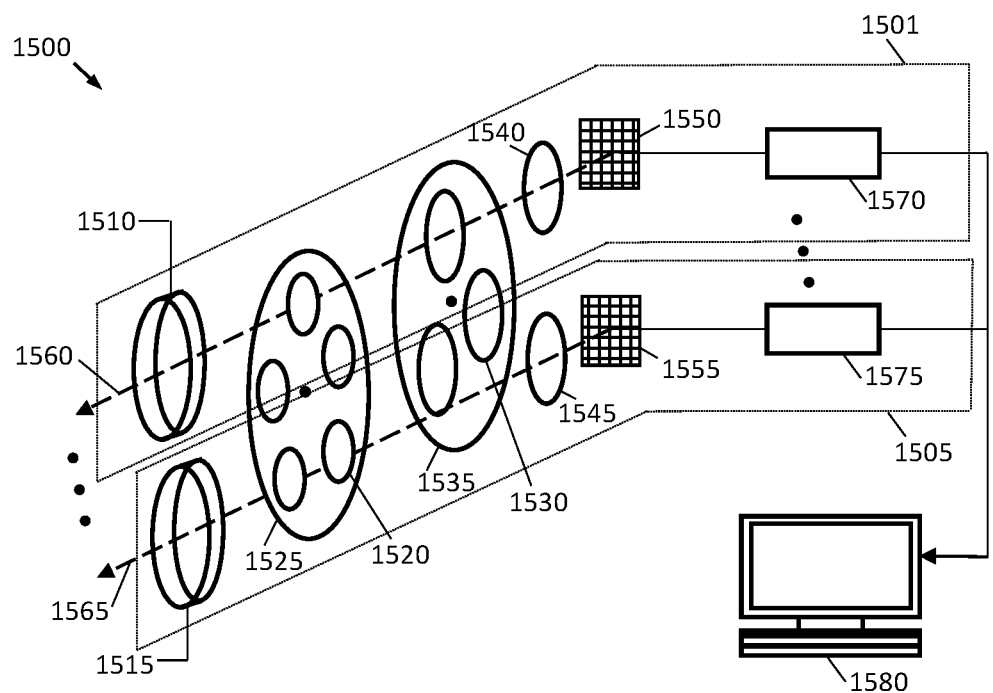
FIG. 9 is a schematic drawing of an embodiment of the invention with a color filter wheel shared between five or more imaging subsystems of an imaging circadiometer.

In another embodiment shown in FIG. 9, the imaging circadiometer 1500 is comprised of two arrangements of optical components, of which some are common to the two imaging arrangements. The first arrangement includes one or more imaging lenses 1510, five or more filters 1520 mounted on a first mechanically rotatable disk 1525, one or more neutral density (or clear) filters 1530 mounted on a second mechanically rotatable disk 1535, a mechanical or electro-optic shutter 1540, and a digital image sensor 1550. The imaging lenses 1510, the color filter 1520, the neutral density filter 1530, the shutter 1540 and digital image sensor 1550 are aligned on a common optical axis 1560. The second arrangement includes one or more imaging lenses 1515, the five or more filters 1520 mounted on the first mechanically rotatable disk 1525, the one or more neutral density (or clear) filters 1530 mounted on the second mechanically rotatable disk 1535, a mechanical or electro-optic shutter 1545, and a digital image sensor 1555. The imaging lenses 1515, the color filter 1520, the neutral density filter 1530, the shutter 1545 and digital image sensor 1555 are aligned on a common optical axis 1565. The filters 1520 are individually positionable on the optical axis, or situated on the first mechanically rotatable disk so that they can be individually positioned on the optical axis. The neutral density filters 1530 are individually positionable on the optical axis, or situated on the second mechanically rotatable disk so that they can be individually positioned on the optical axis.

In one embodiment, optical axes 1560, 1565 are parallel. In another embodiment, the optical axes 1560, 1565 are not parallel and the fields of view of imaging systems 1501, 1505 overlap at some distant focal point. In this latter case, the filters 1520 and 1530 are mounted at a corresponding angle on the rotatable disks 1525, 1535, so that when they are on the respective optical axes they are in planes that are normal to the respective optical axes. As may be readily understood, three or more imaging subsystems may be similarly arranged with common rotatable wheels 1525 and 1535. As may also be readily understood, filters 1520 and neutral density (or clear) filters 1530 rotated into position by rotatable disks may also be positioned along common optical axes 1560 and 1565 via alternative positioning mechanics such as one or more linear translation stages.

In operation, neutral density (or clear) filters 1530 are rotated into position, following which the filters 1520 are rotated into position prior to opening shutters 1540 and 1545 and simultaneously capturing two digital images with image sensors 1550 and 1555. The captured images are processed by analog-to-digital converter and associated electronics modules 1570 and 1575 respectively, then transmitted to a computer system 1580 for further processing or data storage. The computer system comprises one or more processors connected to non-transient computer readable memory in which is stored computer readable data and computer executable instructions. The computer readable instructions are executed by the processor to perform the necessary processing of the captured images and to store and retrieve the data.

Figure 10:
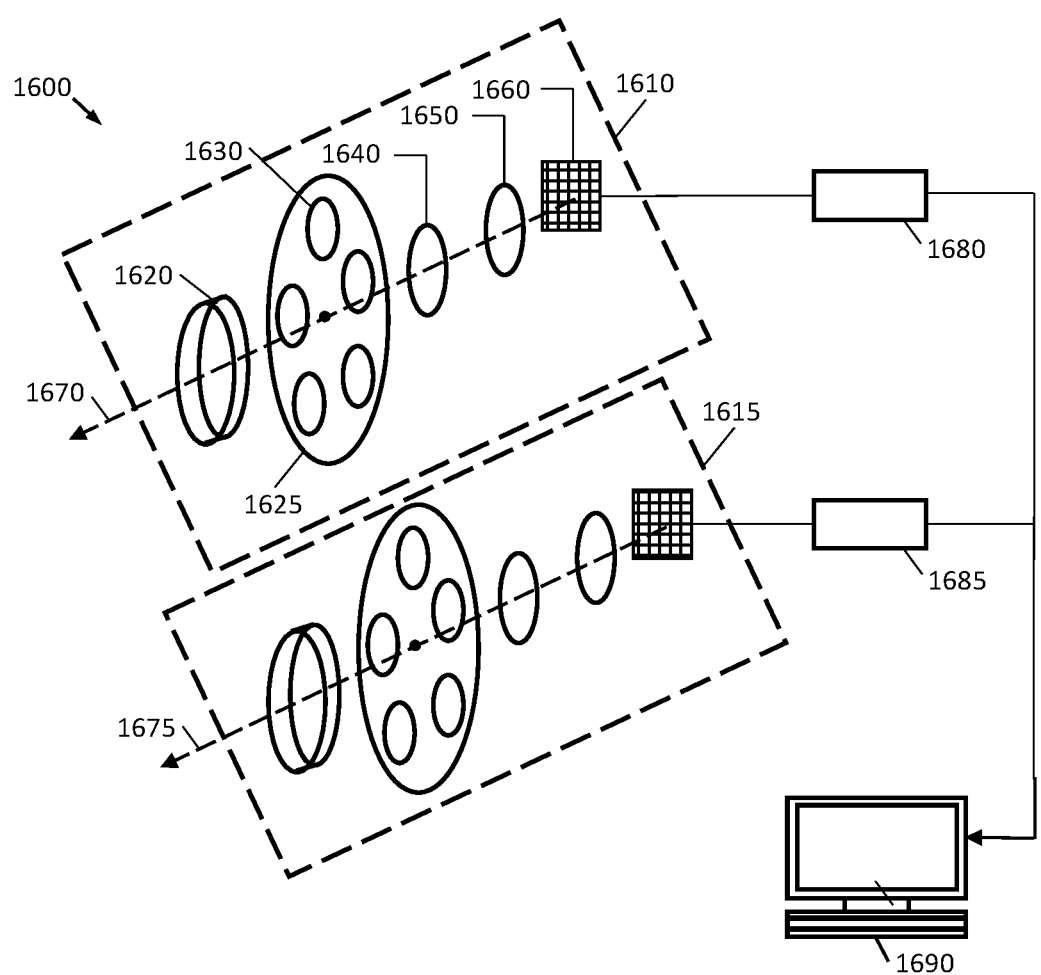
FIG. 10 is a schematic drawing of an embodiment of the invention for characterizing and calibrating stereo visual displays.

In one useful configuration shown in FIG. 10, two identical imaging circadiometers 1610, 1615 are spaced apart with their optical axes 1670, 1675 at a distance equal to that of the average human interocular distance (63 mm) to form a dual imaging circadiometer 1600. Other human interocular distances are possible in other embodiments. The combination of the spectral transmittance of filters 1630 and the spectral responsivity of imaging sensor 1660 enable the embodiment to quantify the α-opic distributions of, for example, virtual reality and head-up stereo displays, or a scene. As in the previous embodiment each imaging subsystem 1610, 1615 has an imaging lens 1620, filter wheel 1625 with filters 1630 mounted within it, a neutral density filter 1640, shutter 1650 and digital image sensor 1660 all aligned on a common optical axis 1670. The captured images are processed by analog-to-digital converter and associated electronics modules 1680 and 1685 respectively, then transmitted to a computer system 1690 for further processing or data storage.

Figure 11:
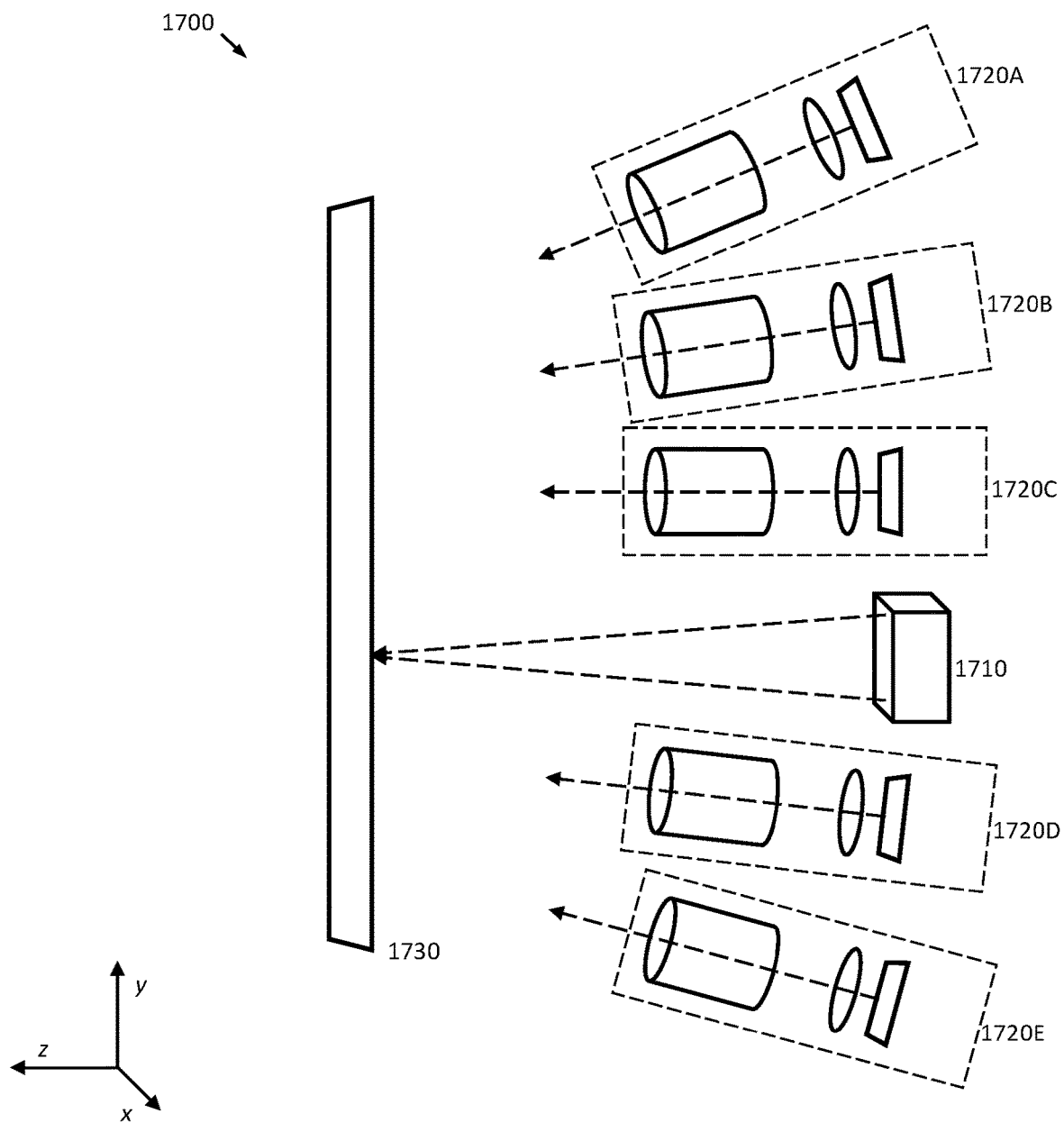
FIG. 11 is a schematic drawing of an imaging circadiometer with a range finder, according to an embodiment of the present invention.

In FIG. 11, the imaging circadiometer 1700 may include a laser range finder, an acoustic range finder, or a similar range finding instrument 1710 mounted with its axis parallel to the z-axis. Each imaging subsystem 1720A-E is equipped with autofocus capabilities, and receives information from the range finding instrument 1710 to focus on an object plane 1730 at a distance indicated by the range finding instrument, wherein the object plane is assumed to be parallel to the x-y plane.

Each imaging subsystem 1720A-E may further include a plenoptic (aka "light field") imaging subsystem, wherein the depth of field and target plane can be determined a posteriori using computational photography techniques, thereby obviating the need for autofocus capabilities.

Figure 12:
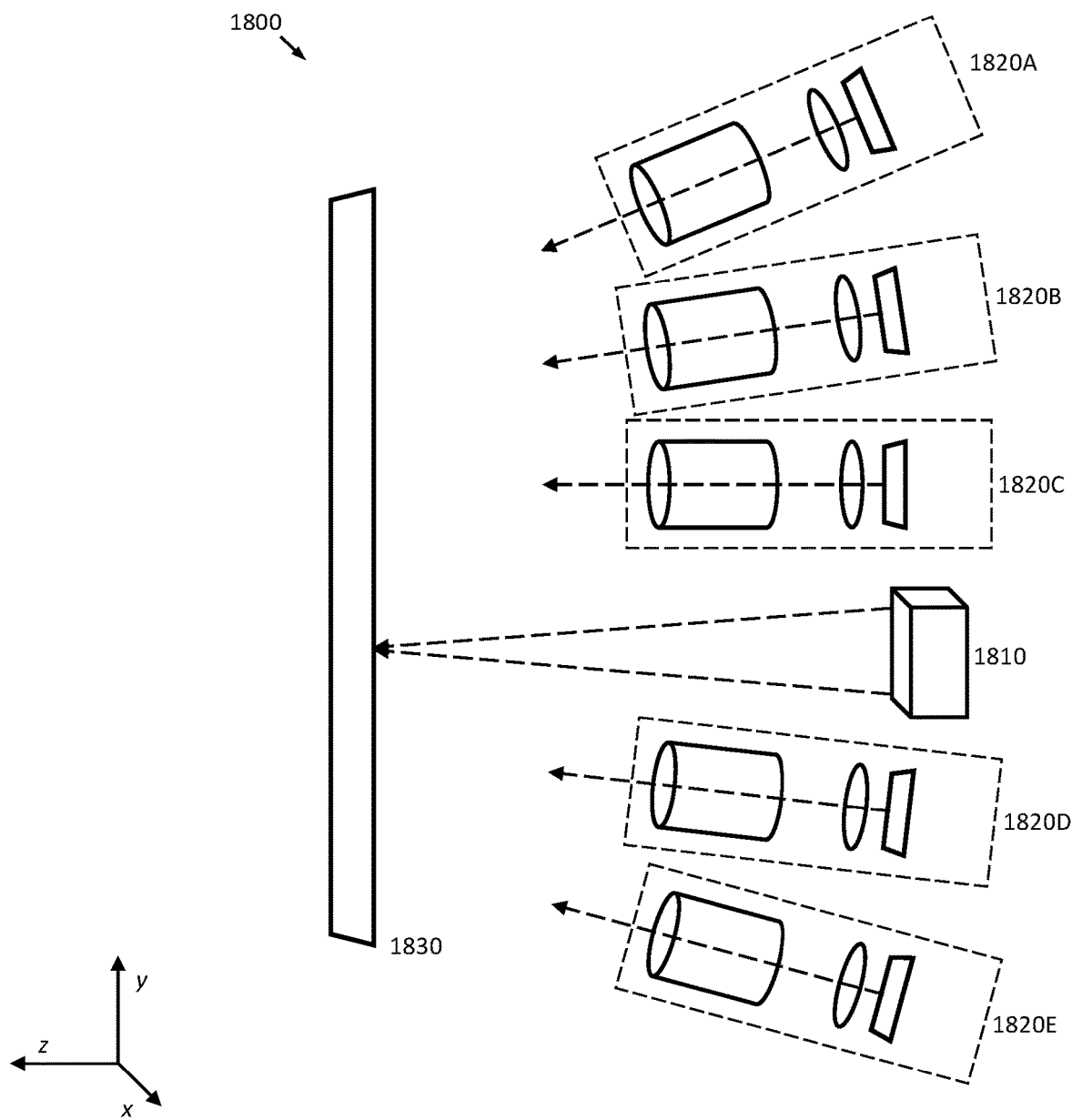
FIG. 12 is a schematic drawing of an imaging circadiometer with a spectroradiometer, according to an embodiment of the present invention.

In FIG. 12, the imaging circadiometer 1800, with multiple imaging subsystems 1820A-E, includes a spectroradiometer 1810 mounted with its axis parallel to the z-axis. The spectroradiometer may be used to improve the measurement accuracy of each imaging subsystem 1820 via comparison of a commonly measured area of the target display 1830 and measure metrics such as display scotopic and melanopic radiance. The spectroradiometer 1810 can be provided with its own optical components (not shown) that are focused on the target object, or it can be optically connected to an optical train of the imaging system 1800 by means of a moveable mirror, a beamsplitter mirror, or an optical pellicle. In some embodiments the spectroradiometer is not mounted coaxially with the z-axis.

In another embodiment, an optical flicker sensor (not shown) can be mounted parallel to the z-axis. In some embodiments the optical flicker sensor is included, but not mounted parallel to the z-axis. The optical flicker sensor may be used to determine an optimal set of exposure times to be used by the imaging subsystems 1820A-E.

Figure 13:
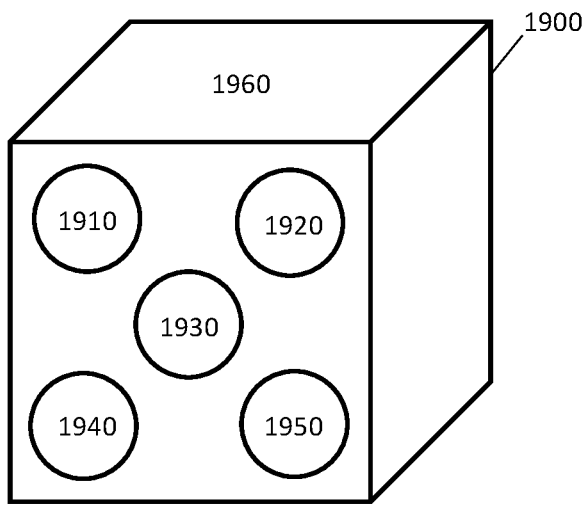
FIG. 13 is a schematic drawing of an imaging circadiometer with modular imaging subsystems mounted in a common chassis, according to an embodiment of the present invention shown in FIG. 2.

FIG. 13 shows an example implementation 1900 of at least some of the above embodiments, wherein five modular and interchangeable digital imaging subsystems 1910, 1920, 1930, 1940, and 1950 are mounted in a common chassis 1960. In one embodiment the optical axes of the imaging subsystems 1910-1950 are fixed and are parallel to each other. In another embodiment the optical fields of view overlap at the target object plane. In yet another embodiment the imaging optical axes are mechanically adjustable, to vary from a first position in which they are parallel to a second position in which they intersect at the target object plane. The optical axes are adjustable to allow variable overlap of the optical fields of view of the imaging subsystems, and the optical fields of view overlap at an object plane corresponding to the captured images. The orientation of the imaging sensors (not shown) within each imaging subsystem may further be optionally adjustable by mechanical means to be perpendicular to their respective optical axes or angled relative to the target object plane to satisfy the Scheimpflug condition.

Figure 14:
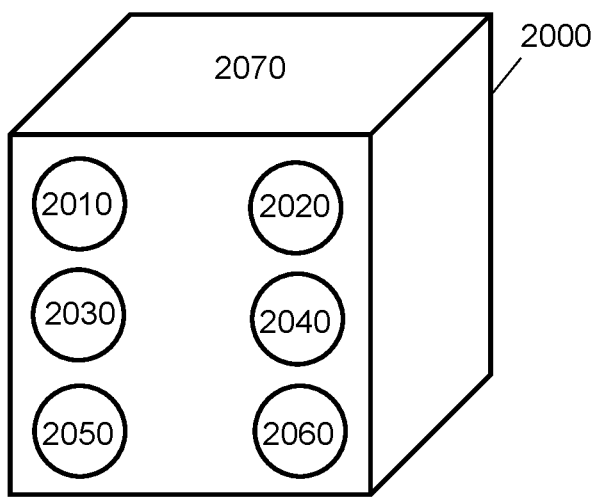
FIG. 14 is a schematic drawing of an imaging circadiometer with modular imaging subsystems, including a neuropic imaging sub-system, mounted in a common chassis, according to another embodiment of the present invention shown in FIG. 2.

FIG. 14 shows another example implementation 2000 wherein the presence of a sixth imaging sub-system would lead to another possible assembly configuration. Enclosed within the hardware shell 2070 are the six imaging subsystems 2010 to 2060.

Figure 15:
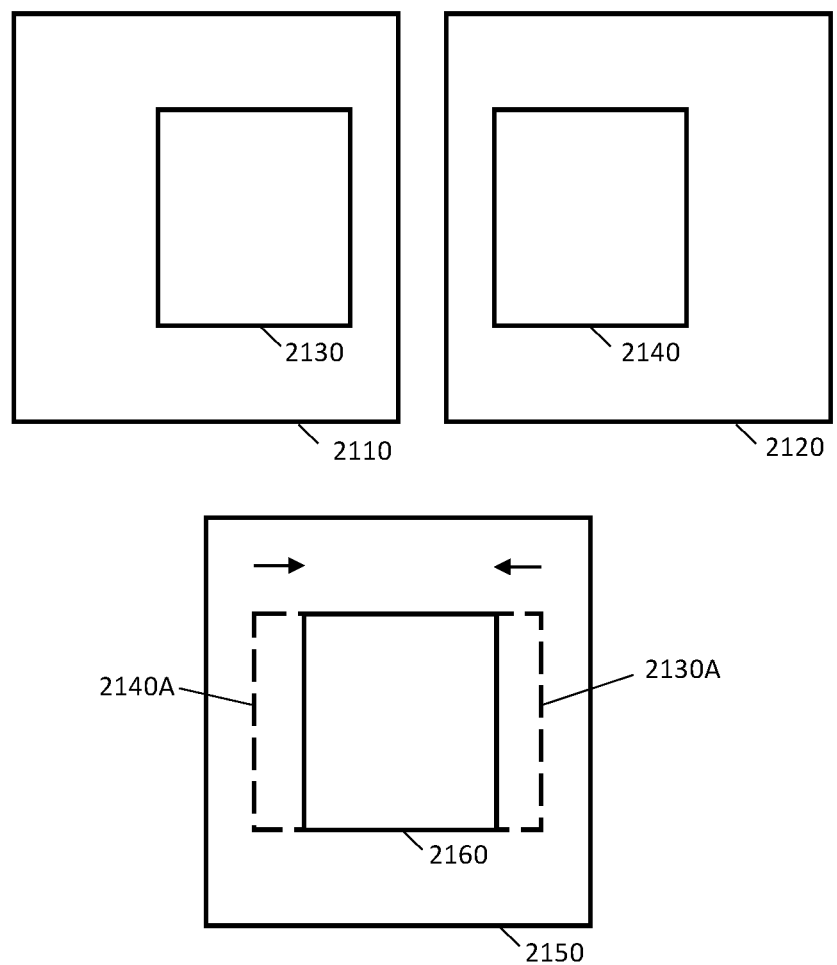
FIG. 15 illustrates image registration for two images captured by one embodiment of the imaging circadiometer.

In another embodiment of FIG. 5, each digital imaging subsystem 1110A-E captures a digital image in which the imaged object may be offset horizontally and/or vertically, i.e. in a direction perpendicular to the respective optical axis. FIG. 15 shows, for example, images 2110 and 2120 captured by two imaging subsystems, with image portions 2130 and 2140 respectively of an LCD panel. These two images 2110, 2120 are composited into a single two-layer image 2150, wherein images 2110 and 2120 are offset horizontally such that they are registered, i.e. the common portions 2130, 2140 of the images are coincident with each other. In the composited image 2150, the image portion 2130 has been shifted to the left from position 2130A, and image portion 2140 has been shifted to the right from position 2140A, such that image portions 2130 and 2140 are coincident and seen as image portion 2160. Not shown in FIG. 15, image registration may also include rotational and magnification transformations. Assuming that the imaging subsystems introduce only sub-pixel geometric distortion, in an ideal case there will be a one-to-one correspondence between the pixels of the two layers of image portion 2160. In practice it may be difficult to register images to within several pixels or less due to focus or resolution limitations, the ability to accurately locate the common portions in the images, and lens distortion among other factors. For embodiments of the imaging circadiometer, there are typically more than two imaging subsystems, with both horizontal and vertical offsets required between all images to achieve image registration. However, the principle of image registration is the same as described for two underlying images.

Referring again to FIG. 5, in a further embodiment, the digital image sensor 1120 of each of the outer imaging subsystems 1110A, 1110E is offset from its optical axis 1150. In this case, image registration may not be required for a predetermined distance between the imaging subsystems 1110A-E and a planar target object being imaged.

Figure 16:
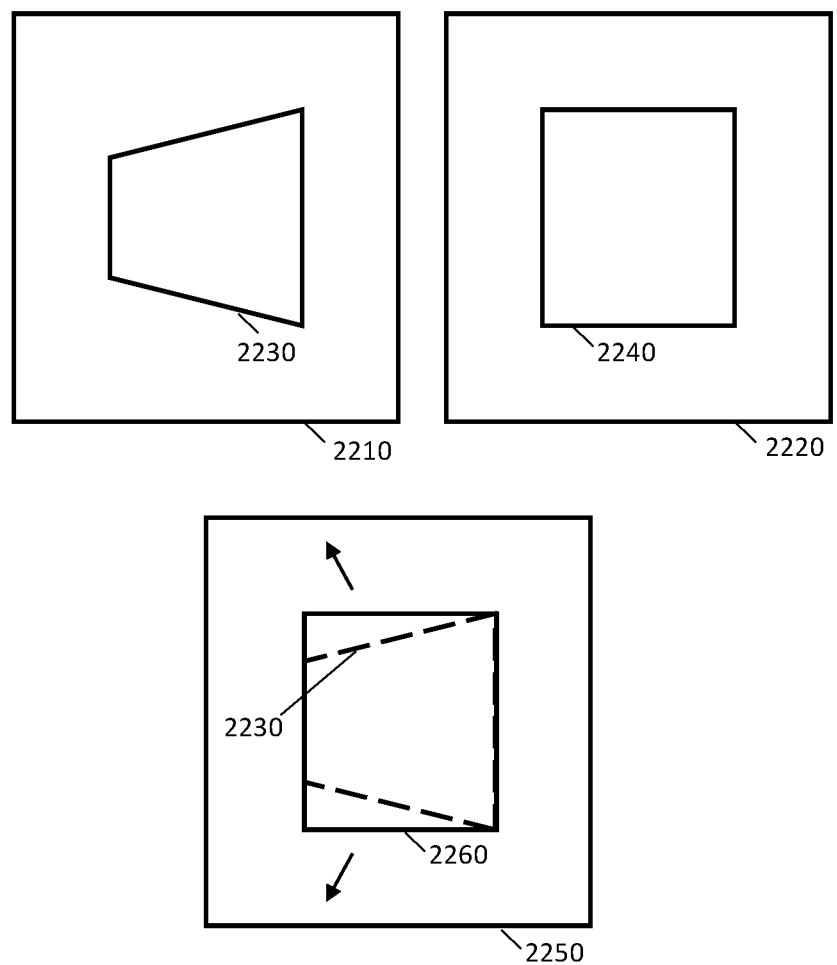
FIG. 16 illustrates image registration for two images captured by another embodiment of the imaging circadiometer.

In the embodiment shown in FIG. 11, the outer digital imaging subsystems 1720A, 1720E capture a digital image in which the imaged object located at the common point of focus may exhibit geometric keystoning. FIG. 16 shows, for example, images 2210 and 2220 captured by two imaging subsystems, with image portions 2230 and 2240 respectively of an LCD panel. Image 2220 is produced by an imaging subsystem whose optical axis is perpendicular to the LCD panel, while image 2210 is from an imaging subsystem whose optical axis is oblique to the LCD panel, thus resulting in a keystone-shaped object portion 2230.

These two images are composited into a single two-layer image 2250, i.e. "stacked" to generate a multispectral image. Image 2210 is subjected to a two-dimensional projective mapping projection, in other words a "keystone correction", so that it is registered with image 2220. The resulting image 2250 shows that the image portion 2230 has been differentially stretched vertically from shape 2230 into a rectangular shape that matches image portion 2240 and registered image portion 2260. Assuming that the imaging subsystems introduce only sub-pixel geometric distortion, in an ideal case there will be a one-to-one correspondence between the pixels of the two layers of image portion 2260. In practice it may be difficult to register images to within several pixels or less due to focus or resolution limitations, ability to accurately locate the common portions in the images, and lens distortion among other factors.

The alignment of the images may include translation, rotation, keystone and magnification adjustments to one or more images, so as to register imaged objects in the same location within the multi-layered image. The images are intentionally overlapped to result in a multi-layer registered image that does not cover an area larger than any of the areas from the individual imaging subsystems.

In general, an imaging subsystem whose optical axis is oblique to the plane of the imaged object must be calibrated in order to determine the necessary parameters for keystone correction. For each input image pixel with horizontal and vertical coordinates x, y, the transformation to output image pixel with horizontal and vertical coordinates x', y' is the rational linear mapping:

$$x'=(ax+by+c)/(gx+hy+1), y'=(dx+ey+f)/(gx+hy+1) \quad \text{(Eq. 2)}$$

where a, b, c, d, e, f, g, and h are constants to be determined.

To perform the calibration, four fiducial marks (ideally representing a square) are positioned on the object to be imaged. An image is captured, and the coordinates of the pixels representing four fiducial marks are designated ($x_0$, $y_0$), ($x_1$, $y_1$), ($x_2$, $y_2$), and ($x_3$, $y_3$). As shown by Heckbert, P., 1999, "Projective Mappings for Image Warping," University of California Berkeley Computer Science Technical Report 15-869, the above constants are given by:

$$\Delta x_1 = x_1 - x_2, \Delta y_1 = y_1 - y_2 \quad \text{(Eq. 3)}$$

$$\Delta x_2 = x_3 - x_2, \Delta y_2 = y_3 - y_2 \quad \text{(Eq. 4)}$$

$$\Sigma x = x_0 - x_1 + x_2 - x_3, \Sigma y = y_0 - y_1 + y_2 - y_3 \quad \text{(Eq. 5)}$$

$$g = (\Sigma x \Delta y_2 - \Sigma y \Delta x_2)/(\Delta x_1 \Delta y_1 \Delta x_2) \quad \text{(Eq. 6)}$$

$$h = (\Delta x_1 \Sigma y - \Delta y_1 \Sigma x)/(\Delta x_1 \Delta y_2 - \Delta y_1 \Delta x_2) \quad \text{(Eq. 7)}$$

$$a = x_1 - x_0 + gx_1, d = y_1 - y_0 + gy_1 \quad \text{(Eq. 8)}$$

$$b = x_3 - x_0 + hx_3, e = y_3 - y_0 + hy_3 \quad \text{(Eq. 9)}$$

$$c = x_0, f = y_0 \quad \text{(Eq. 10)}$$

Keystone correction is applied to one or more of the images captured by the embodiment shown in FIG. 4. In the embodiments shown in FIG. 7 and FIG. 9, keystone correction is unnecessary. However, horizontal and/or vertical offsets may need to be applied to the images to achieve multilayer image registration.

Once the necessary image transformations have been determined through calibration for each imaging subsystem of the imaging circadiometer, the transformations must be applied to each captured image. Equation 2 is executed in parallel, e.g. using multithreaded operations on a multicore processor, field programmable gate array (FPGA), or with a massively-parallel graphics processing unit (GPU).

For some applications, it may be necessary to downscale or upscale one or more images using known image processing techniques. For example, it may be necessary to downscale images in order to achieve image registration with images generated by the image sensor with the lowest resolution, or conversely upscale images to achieve image registration with images generated by the image sensor with the highest resolution.

It may also be an advantage to downscale images by means of pixel binning when performing measurements for various α-opic metrics. For example, the resolution of the human eye is greater for green light than it is for blue light. Consequently, a full resolution image could be used for the scotopic measurements, while pixel binning could be employed to generate reduced resolution images for the S-cone and L-cone images. The advantages of such images include lower image storage requirements and increased image transmission and processing speeds, without sacrificing significant accuracy.

Figure 17:
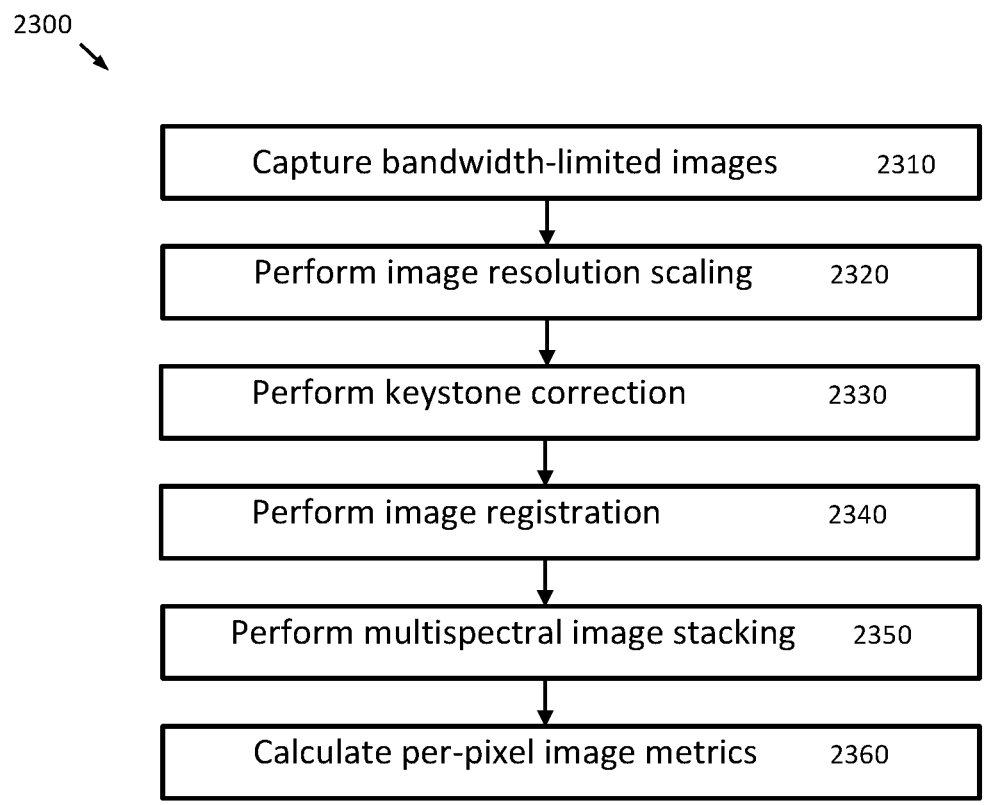
FIG. 17 shows a flowchart illustrating the steps of capturing images and converting them into per-pixel image metrics, according to an embodiment of the present invention.

FIG. 17 illustrates the process 2300 of performing imaging circadiometer measurements.

In step 2310, the calibrated digital imaging subsystems are used to capture N spectrally-bandwidth-limited images, for example S-cone, M-cone, L-cone, scotopic, and ipRGC images.

In step 2320, one or more of the N images may optionally be scaled such that all images have the same horizontal and vertical pixel resolution.

In step 2330, keystone correction according to Equation 2 may be applied as required to one or more of the N images in order to facilitate image registration and stacking.

In step 2340, one or more of the N images may be optionally offset vertically and/or horizontally, magnified and/or rotated in order to achieve per-pixel alignment of the target portions of the images. For example, the target portion may be the display area of an LCD screen.

In step 2350, the N separate images are combined (or "stacked") into a single multispectral image using a suitable image file format.

In step 2360, per-pixel image metrics are calculated using the multispectral image data.

Steps 2320-2360 are performed by a computer, such as computer 1580 or 1690.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification is to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid state memories, etc. The methods may alternatively be embodied partly or wholly in specialized computer hardware, such as an application specific integrated circuit (ASIC) or FPGA circuitry.

It will be clear to one having skill in the art that further variations to the specific details disclosed herein can be made, resulting in other embodiments that are within the scope of the invention disclosed. Two or more steps in the flowchart may be performed in a different order, other steps may be added, or one or more may be removed without altering the main function of the invention. Electronic modules may be divided into constituent modules or combined into larger modules. All parameters, dimensions, materials, and configurations described herein are examples only and actual choices of such depend on the specific embodiment. Accordingly, the scope of the invention is to be construed in accordance with the substance defined by the claims.

Claim Support

Disclosed is an imaging circadiometer comprising an imaging optical system, an optional beam shaping or attenuation optic, a filter wheel, a two-dimensional photodetector array, and a digital image processing unit.

In some embodiments, the filter wheel includes optical filters matching five or six of the spectral transmittance distributions: S-cone, M-Cone, L-Cone, Scotopic, ipRGC, Neuropic.

Disclosed is an imaging circadiometer comprising: one or more optical elements positioned in sequence on an optical axis to image an environment; a photodetector array on the optical axis; a filter wheel having multiple filters that are individually positionable on the optical axis, the filter wheel positioned between the one or more optical elements and the photodetector array; and a digital image processing unit electrically connected to the photodetector array.

In some embodiments, the imaging circadiometer comprises a prefiltering optic positioned on the optical axis between the one or more optical elements and the filter wheel to perform beam apodization, shaping, steering or attenuation; or a postfiltering optic positioned on the optical axis between the filter wheel and the photodetector array to perform further beam apodization, shaping, steering or attenuation; or both the prefiltering optic and the post filtering optic.

In some embodiments, the multiple filters include: a filter with a melanopic spectral transmittance; a filter with a rhodopic spectral transmittance; a filter with an erythropic spectral transmittance; a filter with a chloropic spectral transmittance; and a filter with a cyanopic spectral transmittance.

In some embodiments, the multiple filters include a filter with a neuropic spectral transmittance.

In some embodiments, another identical imaging circadiometer apparatus is positioned so that the two optical axes are separated by a distance.

In some embodiments, the distance is a human interocular distance or an average human interocular distance.

In some embodiments, spectral transmittances of the multiple filters and spectral responsivities of the photodetector arrays are combined to enable the imaging circadiometer to quantify $\alpha$-opic distributions of a display or scene.

In some embodiments, the display is a virtual reality display or a head-up stereo display.

Also disclosed is an imaging circadiometer comprised of two or more arrangements of optical components, wherein: a first arrangement of optical components comprises: one or more imaging lenses; five or more filters; one or more neutral density filters; a mechanical or electro-optic shutter; and a digital image sensor; the one or more imaging lenses, the mechanical or electro-optic shutter and the digital image sensor are aligned on an optical axis; the five or more filters are individually positionable on the optical axis; the one or more neutral density filters are individually positionable on the optical axis; a second arrangement of optical components comprises: one or more further imaging lenses; the five or more filters; the one or more neutral density filters; a further mechanical or electro-optic shutter; and a further digital image sensor; the one or more further imaging lenses, the further mechanical or electro-optic shutter and the further digital image sensor are aligned on a further optical axis; the five or more filters are individually positionable on the further optical axis; and the one or more neutral density filters are individually positionable on the further optical axis.

In some embodiments, the imaging circadiometer comprises a first mechanically rotatable disk on which the five or more filters are mounted; and a second mechanically rotatable disk on which the one or more neutral density filters are mounted.

In some embodiments, there are three or more arrangements of optical components; and the five or more filters are individually positionable on an optical axis of each of a third or more of the three or more arrangements of optical components; and the one or more neutral density filters are individually positionable on the optical axis of each of the third or more of the three or more arrangements of optical components.

In some embodiments, the optical axis is parallel to the further optical axis; or the optical axis is not parallel to the further optical axis and the two or more arrangements of optical components have fields of view that overlap.

In some embodiments, the imaging circadiometer comprises a first mechanically rotatable disk on which the five or more filters are mounted; and a second mechanically rotatable disk on which the one or more neutral density filters are mounted; wherein: the optical axis is not parallel to the further optical axis; and the five or more filters and the one or more neutral density filters are mounted at a corresponding angle on the mechanically rotatable disks.

In some embodiments, the imaging circadiometer comprises a linear translation stage on which the five or more filters are mounted; and a further linear translation stage on which the neutral density filters are mounted.

In some embodiments, five of the five or more filters are different α-opic filters.

In some embodiments, one of the five or more filters is a neuropic spectral response filter.

In some embodiments, the digital image sensors have different resolutions, sizes or types; or at least one digital image sensor is offset from its optical axis; or the arrangements of optical components have a common alignment axis; or the arrangements of optical components have a common point of focus.

In some embodiments, the arrangements of optical components have a common point of focus; and at least some of the digital image sensors are tilted with respect to their optical axes in accordance with the Scheimpflug condition.

In some embodiments, one or more of the arrangements of optical components include a Scheimpflug normalizer prism.

In some embodiments, the imaging circadiometer comprises a laser range finder, wherein each arrangement of optical components autofocuses on an object plane at a distance indicated by the laser range finder; a spectroradiometer that improves a measurement accuracy of each arrangement of optical components; an optical flicker sensor configured to determine an exposure time for the arrangements of optical components; or in each arrangement of optical components, a plenoptic imaging subsystem for determining a depth of field and a target plane of the arrangement of optical elements using computational photographic imaging.

Disclosed is an imaging circadiometer comprising: one or more optical elements positioned in sequence on an optical axis to image an environment; a photodetector array on the optical axis; a filter wheel having multiple filters that are situated to be individually positioned on the optical axis, the filter wheel positioned between the one or more optical elements and the photodetector array; and a digital image processing unit electrically connected to the photodetector array.

Disclosed is an imaging circadiometer comprised of two or more arrangements of optical components, wherein: a first arrangement of optical components comprises: one or more imaging lenses; five or more filters; one or more neutral density filters; a mechanical or electro-optic shutter; and a digital image sensor; the one or more imaging lenses, the mechanical or electro-optic shutter and the digital image sensor are aligned on an optical axis; the five or more filters are situated to be individually positioned on the optical axis; the one or more neutral density filters are situated to be individually positioned on the optical axis; a second arrangement of optical components comprises: one or more further imaging lenses; the five or more filters; the one or more neutral density filters; a further mechanical or electro-optic shutter; and a further digital image sensor; the one or more further imaging lenses, the further mechanical or electro-optic shutter and the further digital image sensor are aligned on a further optical axis; the five or more filters are situated to be individually positioned on the further optical axis; and the one or more neutral density filters are situated to be individually positioned on the further optical axis.

In some embodiments the imaging circadiometer comprises a first mechanically rotatable disk on which the five or more filters are mounted; and a second mechanically rotatable disk on which the one or more neutral density filters are mounted.

In some embodiments there are three or more arrangements of optical components; and the five or more filters are situated to be individually positioned on an optical axis of each of a third or more of the three or more arrangements of optical components; and the one or more neutral density filters are situated to be individually positioned on the optical axis of each of the third or more of the three or more arrangements of optical components.

The invention claimed is:

1. An imaging circadiometer comprising:
   one or more optical elements positioned in sequence on an optical axis to image an environment;
   a photodetector array on the optical axis;
   a filter wheel having multiple wavelength filters that are individually positionable on the optical axis, the filter wheel positioned between the one or more optical elements and the photodetector array; and
   a digital image processing unit electrically connected to the photodetector array wherein the multiple wavelength filters include:
   a wavelength filter with a melanopic spectral transmittance;
   a wavelength filter with a rhodopic spectral transmittance;
   a wavelength filter with an erythropic spectral transmittance;
   a wavelength filter with a chloropic spectral transmittance; and
   a wavelength filter with a cyanopic spectral transmittance.

2. The imaging circadiometer of claim 1, comprising:
   a prefiltering optic positioned on the optical axis between the one or more optical elements and the filter wheel to perform beam apodization, shaping, steering or attenuation; or
   a postfiltering optic positioned on the optical axis between the filter wheel and the photodetector array to perform further beam apodization, shaping, steering or attenuation; or
   both the prefiltering optic and the postfiltering optic.

3. The imaging circadiometer of claim 1, wherein the multiple wavelength filters include a filter with a neuropic spectral transmittance.

4. The imaging circadiometer of claim 1, comprising another identical imaging circadiometer apparatus positioned so that the two optical axes are separated by a distance.

5. The imaging circadiometer of claim 4, wherein the distance is a human interocular distance or an average human interocular distance.

6. The imaging circadiometer of claim 4, wherein the spectral transmittances of the multiple wavelength filters and spectral responsivities of the photodetector arrays are combined to enable the imaging circadiometer to quantify α-opic distributions of a display or a scene.

7. The imaging circadiometer of claim 6, wherein the display is a virtual reality display or a head-up stereo display.

* * * * *